United States Patent
Otani

[11] 3,856,327
[45] Dec. 24, 1974

[54] SAFETY SEAT BELT FOR MOTOR VEHICLE

[75] Inventor: Syuichi Otani, Tokyo, Japan

[73] Assignee: Nissan Motor Company, Limited, Yokohama, Japan

[22] Filed: Mar. 3, 1972

[21] Appl. No.: 231,586

[30] Foreign Application Priority Data
Mar. 11, 1971  Japan.............................. 46-15942

[52] U.S. Cl.......................................... 280/150 SB
[51] Int. Cl.............................................. B60r 21/02
[58] Field of Search ............................ 280/150 SB

[56] References Cited
UNITED STATES PATENTS
3,680,883  8/1972  Keppel......................... 280/150 SB

*Primary Examiner*—Robert R. Song

[57] ABSTRACT

A safety seat belt for a motor vehicle having a door, a floor panel and a ceiling structure and adapted for restraining a passenger from injury in the event the motor vehicle undergoes an excessive deceleration. The safety seat belt includes a lap belt extending over and across a seat portion of a seat and having one end anchored to the floor panel and the other end anchored to an inner panel of the door, a shoulder strap which is anchored at one end to an intermediate portion of the lap belt and at the other to the ceiling structure, the shoulder strap being located in a manner to extend across the passenger's torso, at least one retracting means associated with the lap belt and the shoulder strap for maintaining the lap belt and the shoulder strap in a retracted condition when the door is closed by the passenger, guide ring in which the shoulder strap is slidably received, and a driving unit mounted on the ceiling structure and having means movable in a direction substantially parallel to the ceiling structure, the guide ring being secured to the means and movable therewith.

3 Claims, 3 Drawing Figures

SAFETY SEAT BELT FOR MOTOR VEHICLE

This invention relates in general to safety seat belt for a motor vehicle and, more particularly, to a safety seat belt for restraining a passenger from being thrown forward or injuried in case of accident or collision of the motor vehicle and adapted to be automatically held in operative and inoperative conditions when the passenger gets in or gets out of the motor vehicle.

It is presently one of the mandatory requirements in many of the countries to have motor vehicles equipped with safety seat belts to provide some sort of restraint for a passenger with a view of protecting the passenger from injury in the event the motor vehicle encounters a collision during cruising. The safety seat belt thus equipped on the seat is usually held in a folded condition so that it is necessary to unfasten and fasten the safety seat belt frequently when the passenger gets in a passenger compartment of the motor vehicle thus requiring troublesome manipulating by the passenger. In order to eliminate this difficulty, various attempts has heretofore been made on the safety seat belt but, in spite of these attempts, satisfactory results have not been obtained.

It is, therefore, an object of the present invention to provide an improved safety seat belt specifically suited for use in a motor vehicle, the safety seat belt being adapted to be automatically raised and lowered over a seat portion of a seat of the motor vehicle in accordance with opening and closing movements of a door whereby a passenger is capable of easily getting in a passenger compartment of the motor vehicle to occupy the seat.

Another object of the present invention is to provide an improved safety seat belt for use in a motor vehicle, which safety seat belt is easy to install in a limited working space such as the cabin of the motor vehicle without causing any significant modifications or changes in a passenger compartment.

A still another object of the present invention is to provide an improved safety seat belt for use in a motor vehicle, which safety seat belt is simple in construction and economical to manufacture.

In general, these and other objects and features of the present invention are achieved in a safety seat belt designed to be automatically raised and lowered in accordance with opening and closing movements of a door of a motor vehicle. The safety seat belt consists of a lap belt which extends over and across a seat portion of a seat. The lap belt is anchored at one end to a floor panel of the motor vehicle and at the other to an inner panel of the door. A shoulder strap is anchored at one end to an intermediate portion of the lap belt and at the other to a ceiling structure. This shoulder strap is located in a manner to extend across a passenger's torso. This assembly of lap belt and shoulder strap is usually held in a retracted or operative condition by means of at least one retracting means when the door is maintained in a closed condition. The safety seat belt also consists of a guide ring in which the shoulder strap is slidably received, and a driving unit mounted on a ceiling structure. The driving unit includes an endless means which is movable back and forth substantially parallelly to with the ceiling structure. The guide ring is secured to the endless means and movable therewith. The driving unit is actuated for driving the endless means and accordingly the guide ring secured thereto when the door is opened by the passenger. With the guide ring being driven, the shoulder strap is streched thereby so that the lap belt is raised over the seat portion of the seat whereby the passenger can easily get in the motor vehicle. When the door is closed after the passenger occupies the seat, the guide ring is moved to its initial position to cause the shoulder strap and accordingly the lap belt to be held in a folded condition by the aid of the retracting means. In a preferred embodiment, the driving unit includes an electric motor having a driving shaft, and an electric switch adapted to be switched in accordance with the opening and closing movements of the door. The electric switch is electrically connected to a source of d.c. power and to the electric motor for starting the electric motor in accordance with opening and closing movements of the door. The safety seat belt further consists of a second guide ring in which the lap belt is slidably received, and an additional driving unit which is mounted on the inner panel of the door. The additional driving unit includes an endless means which is diagonally movable back and forth on the inner panel of the door. This endless means carries thereon the second guide ring which is also movable therewith. The additional driving unit is actuated to drive the endless means and second guid ring secured thereto when the door is opened by the passenger so that the lap belt is stretched while the shoulder strap is stretched by the action of the first guide ring whereby the lap belt and shoulder strap are held in a position to allow the passenger to easily enter the passenger compartment of the motor vehicle to occupy the seat.

These and other objects and advantages of the present invention will become more apparent from the following description when taken in conjunction with the accompanying drawings in which same reference numerals are used to designate like component parts and in which.

The present invention will be herein shown and described as applied to a seat belt comprising a lap belt extending over and across a seat portion of a seat and a shoulder strap connected to an intermediate portion of the lap belt and extending upwardly of the seat portion to cross over a passenger's chest and shoulder. It should, however, be noted that the present invention is also applicable to a seat belt comprising only a shoulder strap which extends between a floor panel and a ceiling structure of a motor vehicle in a manner to cross over the passenger's chest and shoulder.

Figure 1:
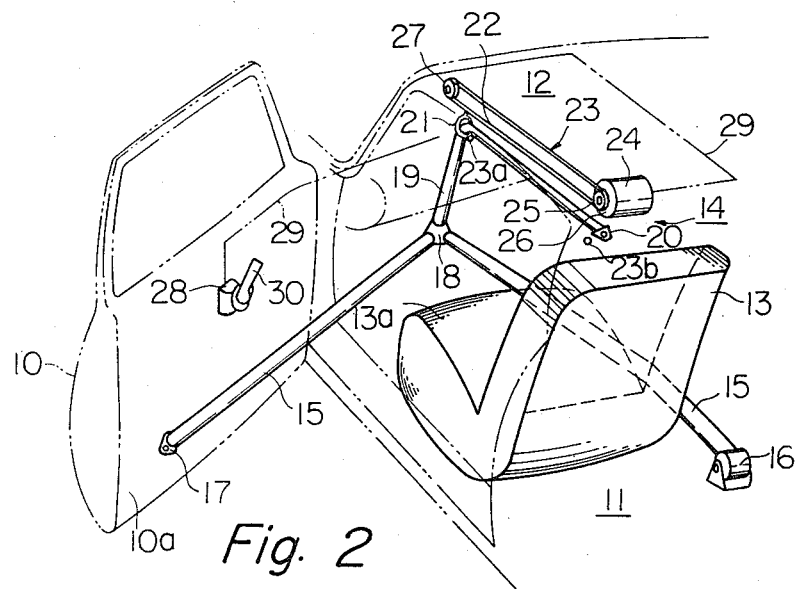
FIG. 1 is a schematic perspective view of a preferred embodiment of a safety seat belt implementing the present invention, the safety seat belt being shown as being held in its inoperative position.

Referring now to the drawings and more particularly to FIG. 1, there is schematically shown the general construction of the safety seat belt according to the present invention. The safety seat belt of the present invention is specifically suited for use in a motor vehicle having a door 10, a floor panel 11 and a ceiling structure 12 all of which are shown in phantom lines in FIG. 1. Indicated at 13 is a seat for a passenger which seat is located on the floor panel 11. The seat 13 is equipped with the safety seat belt implementing the present invention for restraining the passenger from being thrown forward or injured in the event the motor vehicle undergoes an excessive deceleration, the seat belt being generally designated by reference numeral 14.

The safety seat belt 14 is shown to include a cross or lap belt 15 which is secured at one end to the floor panel 11 or to the back of the seat 13 by means of a retractor 16 and at the other to a lower portion of an inner panel 10a of the door 10 by means of an anchoring fitting 17 of a known construction. The lap belt 15 extends over and across a seat portion 13a of the seat 13 in such a manner that it crosses thighs or laps of a passenger (not shown) carried on the seat 13. This lap belt 15 may be either a unitary member or may be made up of two halves which are buckled or releasably joined together as by a buckle connection 18 which may be of any usual or special quick releasing and adjustable type. The retractor 16 may be of any conventional inertia-responsive locking type or may be of the type which is normally operable to allow substantially free slacking and take-up movements of the associated lap belt and which is operable upon collision or a predetermined deceleration of the motor vehicle to lock the retractor against slacking movement of the lap belt to prevent forward movement of the passenger.

The safety seat belt 14 is also shown to include a generally vertical shoulder strap 19 which is connected at its lowermost end to an intermediate portion of the lap belt 15 through, for instance, the buckle connection 18 as shown. The shoulder strap 19 is directed substantially upwardly of the seat portion 13a of the seat 13 in a manner to extend across the passenger's chest and shoulder (not shown) and is anchored at its leading end to the ceiling structure 12 of the cabin of the motor vehicle through an anchoring fitting 20.

Figure 2:
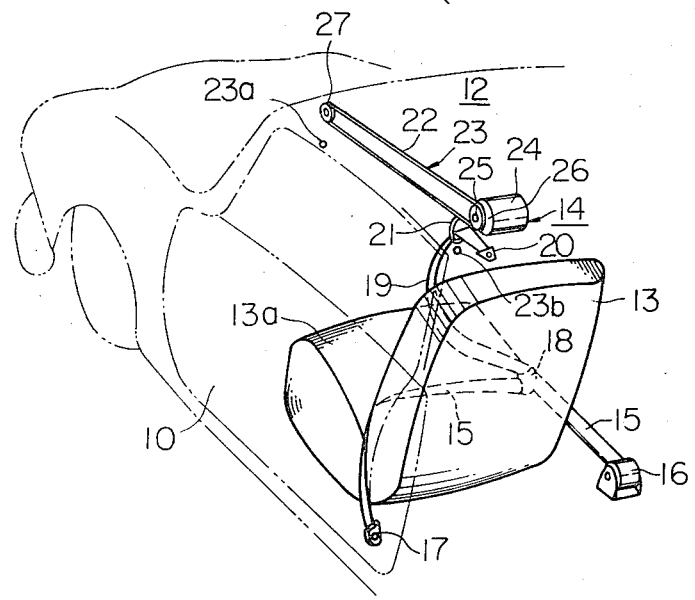
FIG. 2 is a view similar to FIG. 1 but shows the safety seat belt being in its operative position.

In order to provide raising and lowering movement of the belt assembly with respect to the seat portion 13a of the seat 13, a guide ring 21 is provided in which the shoulder strap 19 is slidably received. As shown in FIGS. 1 and 2, the guide ring 21 is movable back and forth substantially parallel to the ceiling structure 12 from a position closest to or adjacent the anchoring fitting 20 (see FIG. 2) to another position remotest from the anchoring fitting 20 (see FIG. 1) so that when the guide ring assumes the position shown in FIG. 1, the shoulder strap 19 is stretched to raise the lap belt 15 to allow the passenger to easily get in the passenger compartment of the motor vehicle to occupy the seat portion 13a. The guide ring 21, which may be of any suitable construction, is secured to an endless means 22 and movable therewith. The endless means 22 may be a belt or a chain and is driven by a driving unit 23.

The driving unit 23 includes an electric motor 24 which may be of any known construction insofar as it functions to rotate a drive shaft 25 either in a normal or reverse directions. The driving unit further includes a driving member 26 fixedly mounted on the drive shaft 25, and a driven member 27 fixedly secured to the ceiling structure 12. The driving member 26 may be a pulley or sprocket, while the driven member 27 may be an idling pulley or a sprocket. As seen in FIGS. 1 and 2, the driving and driven members 26 and 27 are aligned in a manner to be substantially parallel to the plane of the ceiling structure 12 so that the endless means 22 runs back and forth substantially parallel to the ceiling structure 12. This endless means 22 carries the guide ring 21 at its lower section and is movable within a limited travelling path.

The driving unit 23 further includes an electric switch 28 which is electrically connected to a battery (not shown) and the electric motor 24 through a line 29 which is shown in phantom line in FIG. 1. In the embodiment shown in FIG. 1, the electric switch 28 is shown to be provided at a door handle 30 but may be located at any suitable position, as will be discussed hereinafter, in a manner to selectively start the electric motor 24 in accordance with opening and closing movements of the door 10. The provide the limited travelling path of the endless means 22 and the guide ring 21 secured thereto, a pair of limit switches 23a and 23b are incorporated which are electrically connected to the electric motor 24 so that the electric motor 24 drives the drive shaft 25 in the normal and reverse directions between the limit switches.

As the passenger rotates the door handle 30 to open the door 10, the electric switch 28 is switched so that the electric motor 24 is started. With the electric motor 24 being started, the drive shaft 25 is caused to rotate in the normal direction, that is, clockwise as viewed in FIG. 1. This causes the endless means 22 and accordingly the guide ring 21 to move toward a position away from the anchoring fitting 20 and in a direction substantially parallel to the ceiling structure 12. When the guide ring 21 is moved to the position remotest from the anchoring fitting 20, the limit switch 23a is actuated to de-energize the electric motor 24. Thus, the guide ring 21 assumes the position shown in FIG. 1 so that the shoulder strap 19 is held in a stretched out or unfolded condition. Under this condition, the lap belt 15, which is held in a stretched out condition by the door 10, is moved upwardly over the seat portion 13a of the seat 13 with a result that the passenger (not shown) is capable of easily getting in the motor vehicle to occupy the seat without manipulating the lap belt 15 and the shoulder strap 19. It is be noted in this instance that the lap belt 15 can be sufficiently stretched out as shown in FIG. 1 due to slacking movement of the retractor 16 whereby the assembly of shoulder strap 19 and the lap belt 15 is held in an inoperative condition in a satisfactory fashion.

When the door handle 30 is returned to its initial position after the passenger occupies the seat 13, the electric switch 28 is switched so that the electric motor 24 drives the drive shaft 25 in the reverse direction, that is, counterclockwise as viewed in FIGS. 1 and 2. Consequently, the guide ring 21 is moved to a position adjacent the anchoring fitting 20, so that the shoulder strap 19 is not stretched out. In this instance, the lap belt 15 is moved to its folded position by the take-up action of the retractor 16 and, thus, the assembly of the shoulder strap 19 and the lap belt 15 is held in an operative position as seen in FIG. 2.

Figure 3:
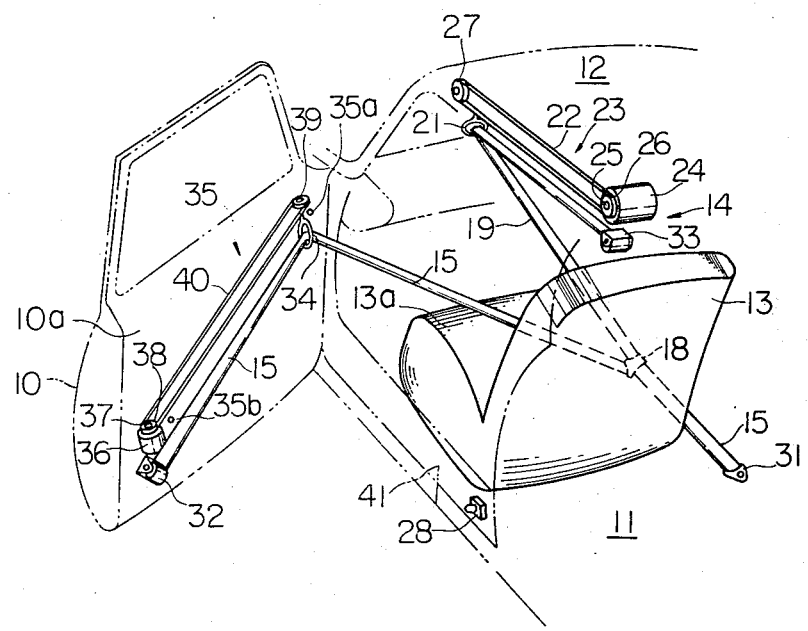
FIG. 3 is a schematic perspective view of another preferred embodiment of the safety seat belt according to the present invention.

FIG. 3 illustrates another preferred embodiment of the safety seat belt according to the present invention. In this illustrated embodiment, the retractor 16 is shown as replaced by an anchoring fitting 31 of known construction which anchoring fitting 31 is secured to the floor panel 11 while the anchoring fitting 17 is shown as replaced by a retractor 32 of the type described above which retractor 32 is fixed to the lower portion of the inner panel 10a of the door 10. Moreover, the shoulder strap 19 is shown as anchored to the ceiling structure by means of a retractor 33 which may be of the type discussed hereinabove.

As seen in FIG. 3, the safety seat belt, which is generally designated by reference numeral 14', further includes a second guide ring 34 in which the lap belt 15 is slidably received. In order to move the second guide ring 34 diagonally on the inner panel 10a of the door 10, an additional driving unit 35 is mounted on the inner panel 10a of the door 10. The additional driving unit 35 consists of an electric motor 36 which is mounted at a lower portion (not identified) of the inner panel 10a of the door 10 as seen in FIG. 3. The electric motor 36 may be of the type as already discussed in connection with the first embodiment of the safety seat belt 14 and has a drive shaft 37 on which a driving member 38 is fixedly mounted. A driven member 39 is mounted at an upper portion (not identified) of the inner panel 10a of the door 10 as viewed in FIG. 3. The driving member 38 may be a pulley or a sprocket, while the driven member 39 may be a pulley or a sprocket of idling type. An endless means 40 is operatively run on the driving member 38 and the driven member 39 and carries thereon the second guide ring 34 so that the second guide ring 34 is movable diagonally from a downward position to an upward position. The additional electric moor 36 is electrically connected to the electric switch 28 so that the electric motor 36 is started simultaneously with the starting of the electric motor 24 of the driving unit 23. In this illustrated embodiment, the electric switch 28 is mounted on a side sill structure 41 at a door opening (not identified) so that the electric switch 28 is switched in accordance with the closing and opening movements of the door 10. It should be appreciated that a pair of limit switches 35a and 35b are provided for providing a limited travelling path for the endless means 40 in a manner as previously described.

When the door 10 is opened by the passenger, the electric switch 28 is switched so that the electric motors 24 and 36 are started. Consequently, the driving member 26 is rotated clockwise thereby to rotate the endless means 22 clockwise. At this instant, the first guide ring 21 is moved in a position away from the anchoring fitting 33, thus stretching out the shoulder strap 19. It is to be noted in this instance that the shoulder strap 19 is sufficiently stretched out by the slacking action of the anchoring fitting 33. At the same time, the second guide ring 34 secured to the endless means 40 is moved diagonally on the inner panel 10a of the door 10 from the downward position to the upward position until the second guide ring 34 assumes a position shown in FIG. 3 and, accordingly, the lap belt 15 is held in a stretched out condition. Thus, the assembly of the lap belt 15 and the shoulder strap 19 is held upwardly or in a position to allow the passenger to easily enter the passenger compartment to occupy the seat 13, as clearly shown in FIG. 3.

When, however, the door 10 is closed after the passenger occupies the seat 13, the electric switch 28 is switched again so that the electric motors 24 and 36 are started to rotate the associated driving members 26 and 38 in the reverse direction. Accordingly, the first guide ring 21 and the second guide ring 34 are caused to move in the position closest to or adjacent the retractors 33 and 32, respectively. Thus, the shoulder strap 19 and the lap belt 15 are held in the folded or operative condition by the take-up action of the retractors 33 and 32.

It will now be appreciated that the safety seat belt according to the present invention is capable of being automatically held in a position to allow a passenger to easily enter the passenger compartment of a motor vehicle to occupy the seat thus eliminating troublesome manipulating of the seat belt by the passenger.

It will also be understood thatt the safety seat belt of the present invention employs a retracting means in an effective manner to provide reliability in operation of the seat belt when the seat belt is held in its operative condition.

It will further be noted that the safety seat belt embodying the present invention permits free forward and rearward movements of the passenger in his seat during normal driving condition of a motor vehicle.

It should also be bore in mind that by suitably adjusting the distance between the first guide ring or second guide ring and the anchoring connection of the seat belt to the stationary part of the motor vehicle, the safety seat belt of the present invention may also have a shock-absorbing function.

While the present invention has been shown and described with reference to the specific embodiments, various modifications and changes, within the scope of the present invention will be apparent to those skilled in the art, and are contemplated to be embraced within the present invention.

What is claimed is:

1. A safety seat belt for a motor vehicle having a door provided with the inner panel and with a door handle, a floor panel, a seat with a seat portion and on up-right backrest portion mounted on the floor panel and a ceiling structure, and adapted to restrain a passenger from injury in the event the motor vehicle undergoes an excessive deceleration comprising, in combination, a lap belt having one end connected to said floor panel by means of an inertia-responsive retracting means and the other end connected to the inner panel of said door, said lap belt extending over and across the seat portion of said seat, a shoulder belt having one end connected to an intermediate portion of said lap belt and the other end secured to an outboard portion of said ceiling structure approximately over said upright backrest portion, an electric actuation mounted on said ceiling structure adjacent said other end of the shoulder belt, a driving member connected to said electric actuator, a driven member mounted on said outboard portion forwardly of said driving member, an endless means provided between said driving and driven members and having straight portions movable back and forth substantially parallel to the plane of said ceiling structure, a guide ring fixedly connected to said endless means and slidably receiving therein said shoulder belt, and an electric switch mounted on said door at the door handle thereof and opened and closed by said door handle, said electric switch being electrically connected to said electric actuator, whereby, when said electric switch is closed, said electric actuator is actuated to move said endless means to cause said guide ring to raise said shoulder belt away from the seat portion.

2. A safety seat belt according to claim 1, further comprising a limit switch mounted on said ceiling structure at a position adjacent each end of one of the straight portions of said endless means to limit the travelling path of said guide ring.

3. A safety seat belt according to claim 1, in which said driving member is a driving pulley and said driven member is an idling pulley.

\* \* \* \* \*